(12) United States Patent
Billings et al.

(10) Patent No.: US 7,712,581 B2
(45) Date of Patent: May 11, 2010

(54) TRANSMISSION HAVING A SEALING BAFFLE

(75) Inventors: Edward J. Billings, Ann Arbor, MI (US); Jatin B. Desai, Canton, MI (US); James J. Idoni, Fenton, MI (US); Richard F. Olenzek, Farmington Hills, MI (US)

(73) Assignee: GM Global Technology Operations, Inc, Detroit, MI (US)

( * ) Notice: Subject to any disclaimer, the term of this patent is extended or adjusted under 35 U.S.C. 154(b) by 339 days.

(21) Appl. No.: 11/535,182

(22) Filed: Sep. 26, 2006

(65) Prior Publication Data

US 2008/0072703 A1 Mar. 27, 2008

(51) Int. Cl.
*F01M 1/00* (2006.01)
(52) U.S. Cl. .................................... 184/13.1
(58) Field of Classification Search ............... 474/144; 74/606 R, 606 A; 184/6.12, 11.1, 6.27, 13.1
See application file for complete search history.

(56) References Cited

U.S. PATENT DOCUMENTS

| | | | | |
|---|---|---|---|---|
| 3,360,998 | A * | 1/1968 | Griffel | 474/153 |
| 5,558,591 | A * | 9/1996 | Erickson et al. | 475/159 |
| 2004/0104536 | A1 * | 6/2004 | Gobeli et al. | 277/400 |
| 2006/0060424 | A1 * | 3/2006 | Tominaga et al. | 184/11.1 |
| 2006/0065487 | A1 * | 3/2006 | Tominaga et al. | 184/6.12 |
| 2006/0179973 | A1 * | 8/2006 | Matsufuji et al. | 74/606 R |

OTHER PUBLICATIONS

U.S. Appl. No. 11/430,256, filed May 8, 2006; Inventors: Norman Schoenik, Brent L. Leinbach, Jeewen Gill.

* cited by examiner

*Primary Examiner*—Robert A Siconolfi
*Assistant Examiner*—Anna Momper

(57) ABSTRACT

A transmission having a sealing baffle is disclosed. The transmission further includes a transmission case, a torque converter housing and a torque transfer member. The transmission case has a drive sprocket and a driven sprocket mounted for rotation therein. The torque converter housing has a fluid pump for pumping lubrication fluid. The torque converter housing is configured to mount to the transmission case. The torque transfer member is coupled to the drive sprocket and to the driven sprocket for transferring a driving torque from the drive sprocket to the driven sprocket. The first baffle is mounted to the torque converter housing. The first baffle has a base, a first flange extending from a first side of the base, a second flange extending from a second side of the base and a sealing lip formed in the second flange. The sealing lip contacts the transmission case to form a seal to prevent the fluid from flooding the torque transfer member. The seal created by compression of the sealing lip against the transmission case and the subsequent thermal expansion of the baffle and sealing lip is maintained over the entire operating temperature range of the transmission.

18 Claims, 4 Drawing Sheets

TRANSMISSION HAVING A SEALING BAFFLE

TECHNICAL FIELD

The invention relates to a transmission having a baffle to enhance the flow of lubricating fluid in and through the fluid pump to ensure adequate lubrication of the transmission at operating temperatures.

BACKGROUND

Road vehicles that have powertrains require lubricating and hydraulic fluids to continuously operate. More specifically, the engine and especially, the automatic transmission, require lubricating and hydraulic fluids or oils to maintain their operation and extend their useful life. Additionally, these fluids are passed through filters to remove contaminants and metal shavings caused by normal operation of the powertrain.

Typically, a torque transfer member such as a chain or belt is disposed in the transmission case and couples an output shaft to a final drive assembly. The chain transfers torque from the output shaft to the final drive assembly to provide a range of selectable gear ratios. Generally, the lubricating fluid that is pressurized and pumped by the fluid pump of the transmission collects in a sump in the bottom of the transmission case. The chain that couples the output shaft to the final drive assembly in many cases contacts the standing lubricating fluid in the sump. As a result of this contact, lubricating fluid is aerated throughout the cavity of the transmission case.

While metal baffles have been introduced in some transmissions to minimize the flooding of the chain with lubricating fluid, an optimal solution has not been achieved. For example, the metal baffles are more expensive to incorporate and increase the overall dimensions of the transmission. Moreover, metal baffles are more difficult to conform to the complex geometries of the transmission.

Thus, there is a need for a new and improved transmission having a baffle that limits lubricating fluid from becoming entrained in the chain coupling the output shaft to the final drive assembly. The new and improved baffle should form a seal to limit lubricating fluid disposed in the sump of the transmission from flooding the chain, should not increase the overall dimensions of the transmission and should not be difficult to conform to the complex geometries of the transmission. Moreover, the seal should exist at high operating temperatures of the transmission.

SUMMARY

In an aspect of the present invention, a transmission having a sealing baffle is provided. The transmission further includes a transmission case, a torque converter housing and a torque transfer member. The transmission case has a drive sprocket and a driven sprocket mounted for rotation therein. The torque converter housing has a fluid pump for pumping lubrication fluid. The torque converter housing is configured to mount to the transmission case. The torque transfer member is coupled to the drive sprocket and to the driven sprocket for transferring a driving torque from the drive sprocket to the driven sprocket. The first baffle is mounted to the torque converter housing. The first baffle has a base, a first flange extending from a first side of the base, a second flange extending from a second side of the base and a sealing lip formed in the second flange. The sealing lip contacts the transmission case to form a seal to prevent the fluid from flooding the torque transfer member. The seal created by compression of the sealing lip against the transmission case and the subsequent thermal expansion of the baffle and sealing lip is maintained over the entire operating temperature range of the transmission.

In still another aspect of the present invention, the baffle is made of a polymer, such as DuPont HYTREL® 7246 or similar material, which flexes when compressed between the case and the torque converter.

In still another aspect of the present invention, the baffle includes at least two mounting apertures for mounting the first baffle to the torque converter housing.

In still another aspect of the present invention, the transmission further includes a second baffle attached to the transmission case, wherein the second baffle has a first side surface.

In yet another aspect of the present invention, the second baffle is made of a metal material.

In yet another aspect of the present invention, the sealing lip is formed in the second flange of the baffle and contacts the first side surface of the second baffle.

In yet another aspect of the present invention, the first flange has an arcuate portion that extends around and shrouds the torque transfer member.

In yet another aspect of the present invention, the second flange has an arcuate portion that extends around and shrouds the torque transfer member.

In yet another aspect of the present invention, the second flange has a straight portion that includes the sealing lip.

In yet another aspect of the present invention, the sealing lip is a tapered edge of the second flange.

In still another aspect of the present invention, a baffle is provided. The baffle includes a base, a first flange, a second flange and a sealing lip. The first flange extends from a first side of the base. The second flange extends from a second side of the base. The sealing lip is formed in the second flange and includes a tapered edge. The tapered edge of the sealing lip is configured to flex when compressed against the transmission case to create a fluid seal.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
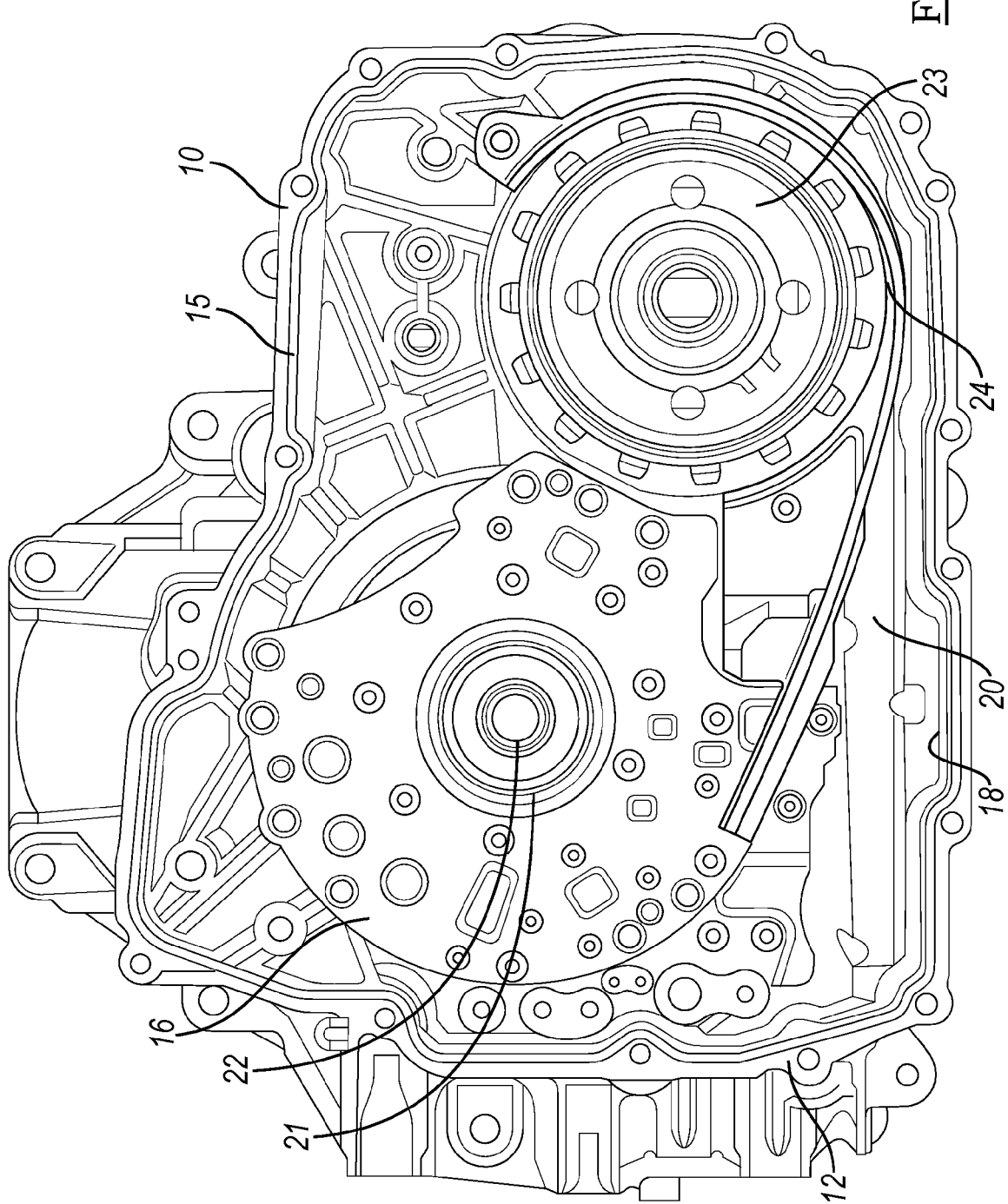
FIG. 1 is an end view of a torque converter housing having a baffle mounted therein, in accordance with an embodiment of the present invention.
Figure 2:
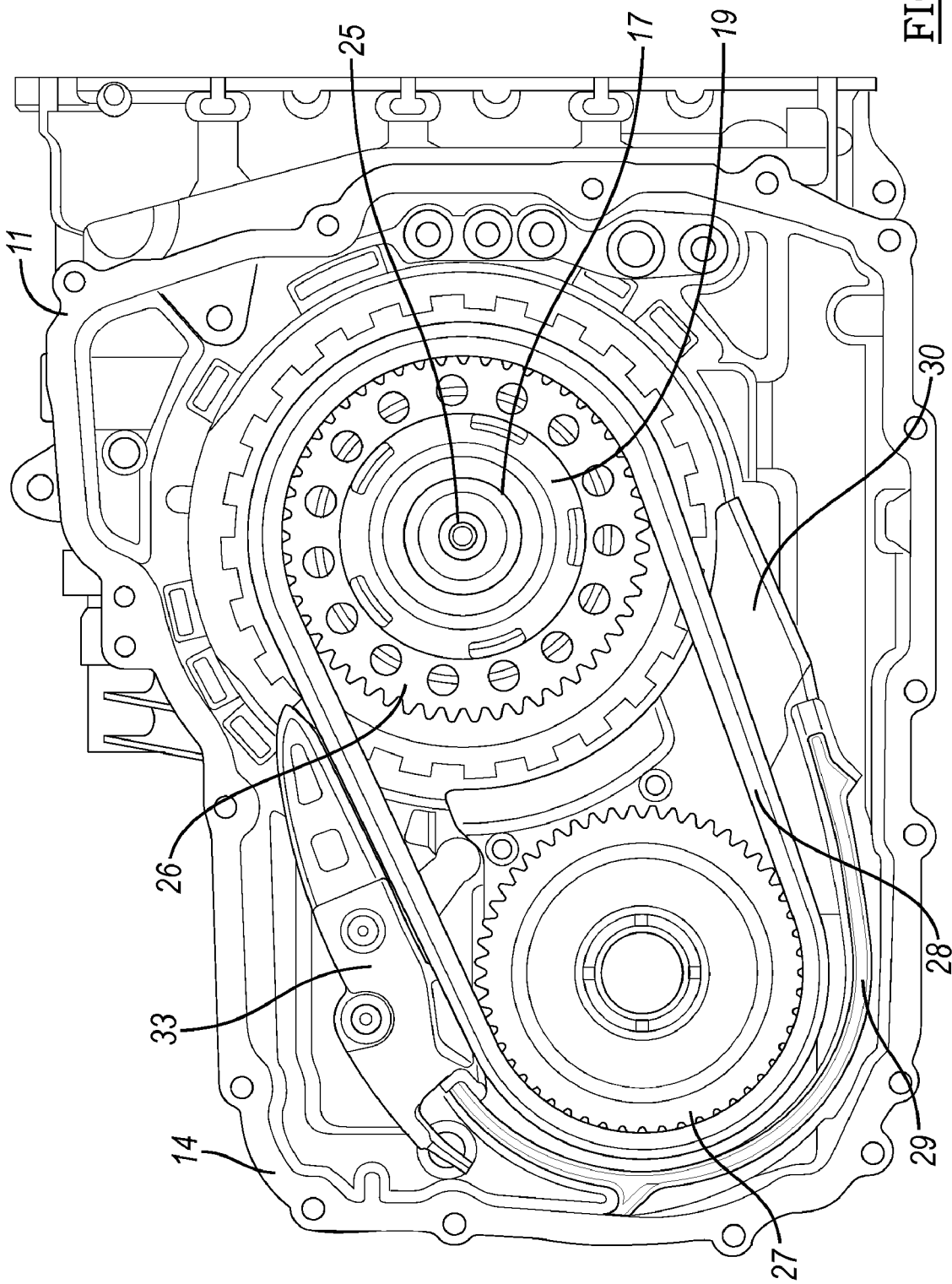
FIG. 2 is a end view of a transmission case that mounts to the torque converter housing, in accordance with an embodiment of the present invention.

Referring to the drawings, wherein like reference numbers refer to like components, in FIGS. 1 and 2 end views of a torque converter housing 10 and a transmission case 11 of a transmission are illustrated. Torque converter housing 10 and transmission case 11 have mating surfaces 12 and 14, respectively, where housing 10 and case 11 meet to form a vehicle transmission. Torque converter housing 10 includes a gasket 15 that is configured to provided a weather-tight seal between housing 10 and case 11. A fluid pump 16 and a torque converter (not shown) are mounted in torque converter housing 10. The torque converter is coupled at a first end to an engine (not shown) and at a second end to fluid pump 16. As well known in the art, the torque converter is a fluid coupling that transfers, and can multiply, torque from the engine to transmission. Fluid pump 16 is configured to pump lubrication fluid throughout the transmission. Generally, fluid pump 16 pressurizes and pumps lubrication fluid from a sump or bottom collection pan 18 through a filter 20. A first bearing support 21 on pump 16 supports a drive sprocket 26 (shown in FIG. 2). Further, a second bearing support 22 for supporting a turbine shaft 25 (shown in FIG. 2) is provided in pump 16 for transferring a drive torque to the transmission case 11, as will be described in further detail below. Radially spaced from fluid pump 16 is a final drive carrier and differential assembly 23. Assembly 23 includes a planetary gear arrangement. Further, a sealing baffle 24 is mounted to torque converter housing 10 and is disposed around final drive carrier and differential assembly 23, in accordance with an embodiment of the present invention. Sealing baffle 24 forms a sealing barrier to enhance the flow of lubrication fluid, as will be described in further detail below.

With continuing reference to FIG. 2, transmission case 11 includes a turbine shaft 25 that is coupled to second bearing support 22. Further, an output shaft bearing surface 17 in case 11 is coupled to first bearing support 21 on pump 16. An output shaft (not shown) is disposed behind a snap retainer ring 19. The output shaft is splined to drive sprocket 26 to transfer drive torque from the torque converter to output shaft. The output shaft drives a plurality of gear sets disposed in transmission case 11 for establishing a range of gear ratios to produce a plurality of forward and reverse gears. Radially spaced from drive sprocket 26 and rotatably supported in transmission case 11 is a driven sprocket 27. The sun gear of the planetary gear arrangement of the final drive carrier and differential assembly 23 couples assembly 23 to the driven sprocket 27. A torque transfer member 28, such as a chain or belt couples drive sprocket 26 to driven sprocket 27. More specifically, torque transfer member 28 transfers a driving torque from output shaft 25 to driven sprocket 27. Driven sprocket 27 is coupled to a final drive assembly (not shown) for transferring torque to the road wheels of a vehicle.

Transmission case 11 further includes a contact surface feature 29 formed in the inside surface of the case. Contact surface feature 29 is configured to cooperate with sealing baffle 24, as will be described in further detail below, to create a seal between sealing baffle 24 and case 11 when torque converter housing 10 is joined with transmission case 11. Preferably, a secondary baffle 30 is attached to transmission case 11 and cooperates with sealing baffle 24 to create a seal between sealing baffle 24 and secondary baffle 30, as will be described in further detail below. Secondary baffle 30 is preferably made of metal, however, the present invention contemplates that secondary baffle 30 is made of other materials such as plastic and the like. Mounted in transmission case 11 and aligned with contact surface feature 29 is a scoop or fluid collection device 33. Scoop 33 cooperates with baffle 24 to collect and pressurize lubrication fluid before the fluid is returned to the sump 18.

Figure 3:
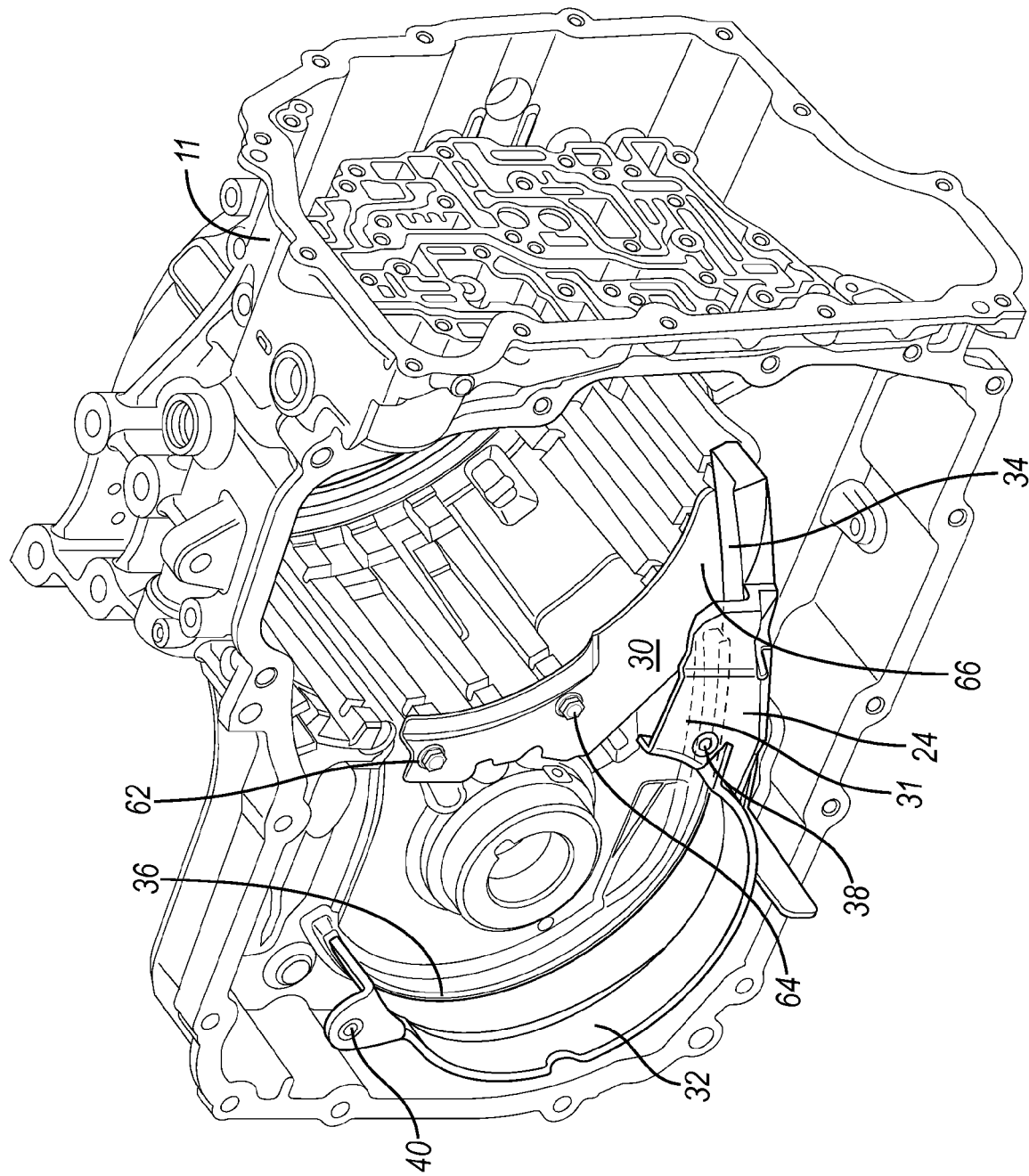
FIG. 3 is a perspective view of the transmission case illustrating the placement of the baffle when the torque converter housing is mount to the transmission case, in accordance with an embodiment of the present invention.

Referring now to FIG. 3, the positioning of baffle 24 against contact surface feature 29 of transmission case 11 and secondary baffle 30 is illustrated, in accordance with an embodiment of the present invention. More specifically, FIG. 3 illustrates how baffle 24 would be positioned when torque converter housing 10 is mounted to the transmission case 11. For illustration purposes and to provide an unobstructed view of the interface of baffle 24 and contact surface 29, the internal components mounted in transmission case 11, as described above, have been removed.

Baffle 24 includes a base 31, a first flange 32, a second flange 34 and a sealing lip 36. Baffle 24 is made of a polymeric material, such as HYTREL® 7246 manufactured by Dupont of Wilmington, Del. Base 31 has two mounting apertures 38, 40 for mounting baffle 24 to torque converter housing 10. Of course, the present invention contemplates the use of additional mounting apertures to secure baffle 24 to torque converter housing 10. Fasteners (not shown) such as screws, bolts or the like are threaded through apertures 38, 40 to secure baffle 24 to torque converter housing 10. When torque converter housing 10 is assembled to transmission case 11, the sealing lip 36 of baffle 24 flexes when compressed between case 11 and torque converter housing 10, as will be described in further detail below. The present invention further contemplates the use of metal inserts in baffle 24 to prevent cracking of baffle 24 when the torque converter housing 10 is mounted to case 11.

Figure 4:
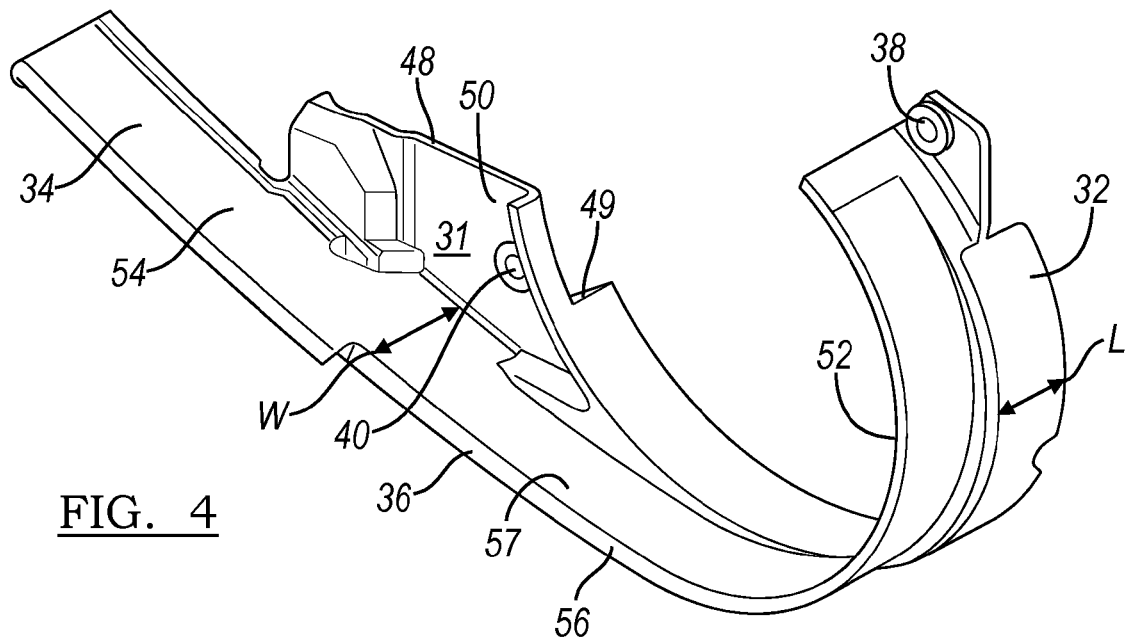
FIG. 4 is a perspective view of the baffle having a sealing lip that is compressed against the transmission case, in accordance with an embodiment of the present invention.

Referring now to FIG. 4, sealing baffle 24 is shown in further detail. First flange 32 extends a distance (l) from a first side 48 of the base 31. Further, first flange 32 is substantially circular along its entire length. A cut-out or opening 49 in first flange 32 provides clearance for torque transfer member 28. Second flange 34 extends a predefined distance (w) from a second side 50 of the base 31. Second flange 34 has an arcuate portion 52 and a straight portion 54. Arcuate portion 52 extends along and follows the curvature of first flange 32 to shroud torque transfer member 28, assembly 23 and driven sprocket 27 from standing lubrication fluid. Arcuate portion 52 is configure to have the sealing lip 36, as will be described herein below. Straight portion 54 also includes the sealing lip 36 and extends from the driven sprocket 27 up toward the drive sprocket 26. The width or distance (l) and (w) of first flange 32 and second flange 34, respectively, are configured to cover or shroud the entire width of torque transfer member 28 and assembly 23.

Figure 5:
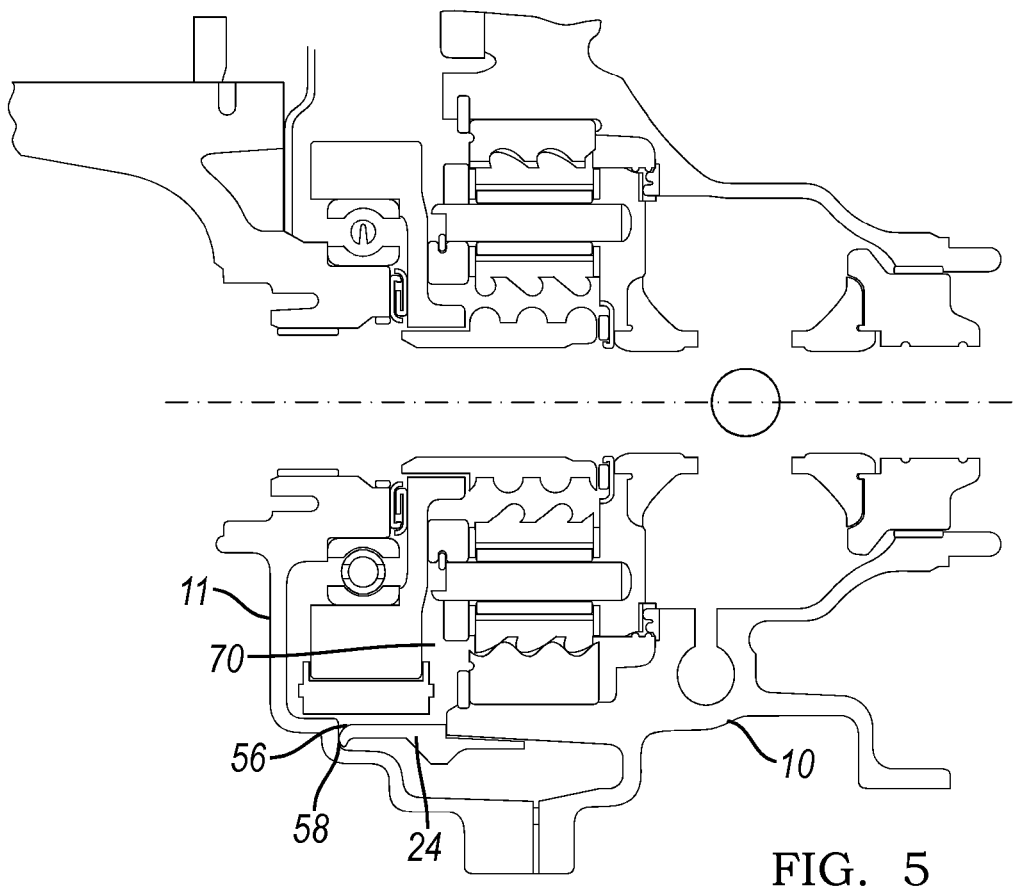
FIG. 5 is a cross-sectional view of the torque converter housing mounted to the transmission case illustrating the contact of the sealing lip with the transmission case, in accordance with an embodiment of the present invention.

As shown in FIGS. 4 and 5, sealing lip 36 formed in second flange 34 includes a slanted surface 56, relative to a top surface 57 of second flange 34. Slanted surface 56 terminates at a tip or apex 58. Tip 58 extends along the entire length of second flange 34. Further, the predefined distance or width (w) of flange 34 is selected to ensure that upon assembly of the torque converter housing 10 to transmission 11, tip 58 of sealing lip 36 contacts contact surface feature 29 formed in transmission case 11. Upon contact with the transmission case 11, sealing lip 36 flexes to form a seal to prevent the lubricating fluid collecting in pan 18 from becoming entrained in the torque transfer member 28.

As shown in FIGS. 2 and 3, secondary baffle 30 is attached to transmission case 11 by a pair of mounting screws or fasteners 62 and 64. Second baffle 30 is configured to prevent or reduce the flow of lubricating fluid to the torque transfer member 28. The straight portion 54 of second flange 34 of baffle 24 contacts secondary baffle 30 on a first side surface 66 of secondary baffle 30. More specifically, the sealing lip 36 of baffle 24 is compressed against first side surface 66 of second baffle 30 upon assembly of the torque converter housing 10 to the transmission case 11.

Reference is now made to FIG. 5, a cross-sectional view of transmission case 11 and torque converter housing 10 is illustrated, in accordance with the present invention. As illustrated, baffle 24 is mounted in torque converter housing 10. Upon assembly of torque converter housing 10 to transmission case 11 the sealing lip 36 is compressed against transmission case 11. More specifically, the surface 56 and tip 58 of sealing lip 36 flex as they meet contact surface 29 in transmission case 11 to form a seal between case 11 and baffle 24. As shown, in FIGS. 1, 2 and 5 the placement of baffle 24 between transmission case 11 and converter housing 10 defines a cavity 70. A portion of torque transfer member 28 is disposed within cavity 70. Cavity 70 formed by the contact of sealing lip 36 with transmission case 11 prevents lubricating fluid collecting in the bottom of the transmission case 11 from being pickup by the torque transfer member 28 and spread or sprayed throughout transmission case 11. Thus, the present invention enhances the flow and distribution of lubricating fluid throughout the transmission.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. A transmission comprising:
a transmission case having a first wall and a second wall perpendicularly mounted to the first wall, wherein the first wall rotatably supports a drive sprocket and a driven sprocket, and wherein the second wall has a mating surface;
a housing having a fluid pump, for pumping lubrication fluid, and a torque converter mounted for rotation therein, wherein the housing further includes a mating surface, and a gasket, and wherein the gasket is disposed between the mating surface of the second wall of the transmission case and the mating surface of the housing to form a seal;
a torque transfer member coupled to the drive sprocket and to the driven sprocket for transferring a driving torque from the drive sprocket to the driven sprocket;
a first baffle mounted to the housing, wherein the first baffle has a planar base, a first arcuate flange extending from a first side of the base, a planar flange extending from a second side of the base and a sealing lip formed in the planar flange;
a second baffle mounted to the first wall of the transmission case, wherein the second baffle has a planar base having a first side surface; and
wherein the sealing lip contacts the first wall of the transmission case to form a seal to enhance the flow of lubrication fluid around the torque transfer member.

2. The transmission of claim 1, wherein the first baffle is made of a polymer that flexes when compressed between the case and the torque converter.

3. The transmission of claim 1, wherein the base of the first baffle further comprises at least one mounting aperture for mounting the first baffle to the housing.

4. The transmission of claim 1, wherein the second baffle is made of metal.

5. The transmission of claim 1, wherein a first portion of the sealing lip formed in the planar flange of the first baffle contacts the first side surface of the second baffle.

6. The transmission of claim 1, wherein the planar flange has a straight portion that includes the sealing lip.

7. The transmission of claim 1, wherein the sealing lip is a tapered edge of the planar flange.

8. The transmission of claim 1, further comprising a contact surface feature formed in the first wall of the transmission case and configured to contact a portion of the sealing lip of the first baffle to create a seal.

9. The transmission of claim 1 wherein the first baffle further includes a second arcuate flange adjacent to both of the first arcuate flange and the planar flange.

10. The transmission of claim 9 wherein the second arcuate flange of the first baffle further includes an edge having a sealing lip aligned with the sealing lip of the planar flange.

11. The transmission of claim 10 wherein the sealing lips of the planar flange and the second arcuate flange of the first baffle form a tapered edge.

12. A baffle for use in a vehicle transmission, the baffle for attachment to a torque converter housing between the torque converter housing and a transmission case of the transmission, the baffle comprising:
a planar base having at least one mounting aperture;
a first arcuate flange extending from a first side of the base;
a planar flange extending from a second side of the base;
a second arcuate flange adjacent to both of the first arcuate flange and the planar flange; and
a sealing lip formed in the planer flange and the second arcuate flange, wherein the sealing lip contacts the transmission case to form a seal.

13. The baffle of claim 12, wherein the baffle is made of a polymer that flexes when compressed between the case and the torque converter.

14. The baffle of claim 12, wherein the baffle further comprises a mounting flange disposed perpendicularly on the second arcuate flange, wherein the mounting flange has at least one mounting aperture for mounting the baffle to the torque converter housing.

15. The baffle of claim 12, wherein the second arcuate flange further includes an edge having a sealing lip aligned with the sealing lip of the planar flange.

16. The baffle of claim 12, wherein the sealing lip of the planar flange is a tapered edge.

17. A baffle for use in a vehicle transmission, the baffle locatable between a torque converter housing and a transmission case of the transmission, the baffle comprising:
a planar base having at least one mounting aperture for mounting to the torque converter housing;
a substantially circular first flange extending a first distance from a first side of the base; and
a second flange extending a second distance from a second side of the base, and wherein the second flange has a straight portion and an arcuate portion, and wherein the arcuate portion follows the curvature of the first flange, and
wherein the arcuate portion and the straight portion of the second flange have a sealing lip that contacts the transmission case to form a seal.

18. The baffle of claim 17 wherein the sum of the first and second distances equal the distance between the torque converter housing and the transmission case.

* * * * *